United States Patent
Nakanishi et al.

(10) Patent No.: US 7,161,588 B2
(45) Date of Patent: Jan. 9, 2007

(54) TOUCH PANEL AND ELECTRONIC APPARATUS USING THE SAME

(75) Inventors: Akira Nakanishi, Osaka (JP); Tetsuya Tadokoro, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 358 days.

(21) Appl. No.: 10/332,419

(22) PCT Filed: Jul. 26, 2002

(86) PCT No.: PCT/JP02/04295

§ 371 (c)(1),
(2), (4) Date: May 23, 2003

(87) PCT Pub. No.: WO02/091161

PCT Pub. Date: Nov. 14, 2002

(65) Prior Publication Data

US 2004/0017363 A1    Jan. 29, 2004

(30) Foreign Application Priority Data

May 7, 2001    (JP)    ............................ 2001-136014

(51) Int. Cl.
*G09G 5/00* (2006.01)

(52) U.S. Cl. ...................... 345/173; 345/176

(58) Field of Classification Search ........ 345/173–175, 345/176, 177, 156; 178/18.01, 18.02, 18.03; 428/212, 213; 257/437; 427/164, 165; 200/310; 349/104, 105; 359/580, 581, 586, 589; 430/156, 430/157; 40/152, 600
See application file for complete search history.

(56) References Cited

U.S. PATENT DOCUMENTS

| | | | |
|---|---|---|---|
| 6,605,789 B1 * | 8/2003 | Chen et al. | 200/310 |
| 6,771,327 B1 * | 8/2004 | Sekiguchi | 349/12 |
| 6,958,748 B1 * | 10/2005 | Fukui et al. | 345/173 |
| 2001/0013861 A1 * | 8/2001 | Shimizu | 345/173 |
| 2003/0127308 A1 * | 7/2003 | Chen et al. | 200/310 |

FOREIGN PATENT DOCUMENTS

| | | |
|---|---|---|
| JP | 5-114329 | 5/1993 |
| JP | 9-24571 | 1/1997 |
| JP | 11-202322 | 7/1999 |
| JP | 11-297160 | 10/1999 |
| JP | 2000-207983 | 7/2000 |

OTHER PUBLICATIONS

PCT International Search Report for PCT Application No. PCT/JP02/04295 dated Jun. 4, 2002.
English Translation Form PCT/ISA/210 for PCT Application No. PCT/JP02/04295 dated Jun. 4, 2002.

* cited by examiner

*Primary Examiner*—Nitin Patel
(74) *Attorney, Agent, or Firm*—RatnerPrestia (57) ABSTRACT

A touch panel comprising: a resin substrate; a first film with one surface provided with a first conductive layer and another surface adhering the resin substrate; a second film provided with a second conductive layer on one surface facing the first conductive layer of the first film; and a third film adhering a surface of the resin substrate opposite to the surface the first film is adhered. The first and third films sandwich the resin substrate via adhesive layers. Warp caused by changes in temperature and humidity during and after the production of the touch panels can be decreased, thereby achieving application of the touch panels to a large-sized display apparatuses.

14 Claims, 6 Drawing Sheets

TOUCH PANEL AND ELECTRONIC APPARATUS USING THE SAME

This application is a U.S. National Phase Application of PCT International Application PCT/UP02/04295.

TECHNICAL FIELD

The present invention relates to a touch panel which is mounted on a display surface of an apparatus such as a liquid crystal display device, and with which a user can input a predetermined signal by pressing a part of the touch panel corresponding to a specific sign on a display screen by a pen or a finger.

BACKGROUND ART

In recent years, with a growing usage of mobile apparatuses, an increasing number of mobile apparatuses became equipped with a touch panel with which a user can input certain signals by pressing parts of the touch panel corresponding to a specific signs on a display screen by a pen or a finger. Particularly, there are growing demands for lightweight plastic touch panels that are resistant to a dropping impact.

Figure 9:
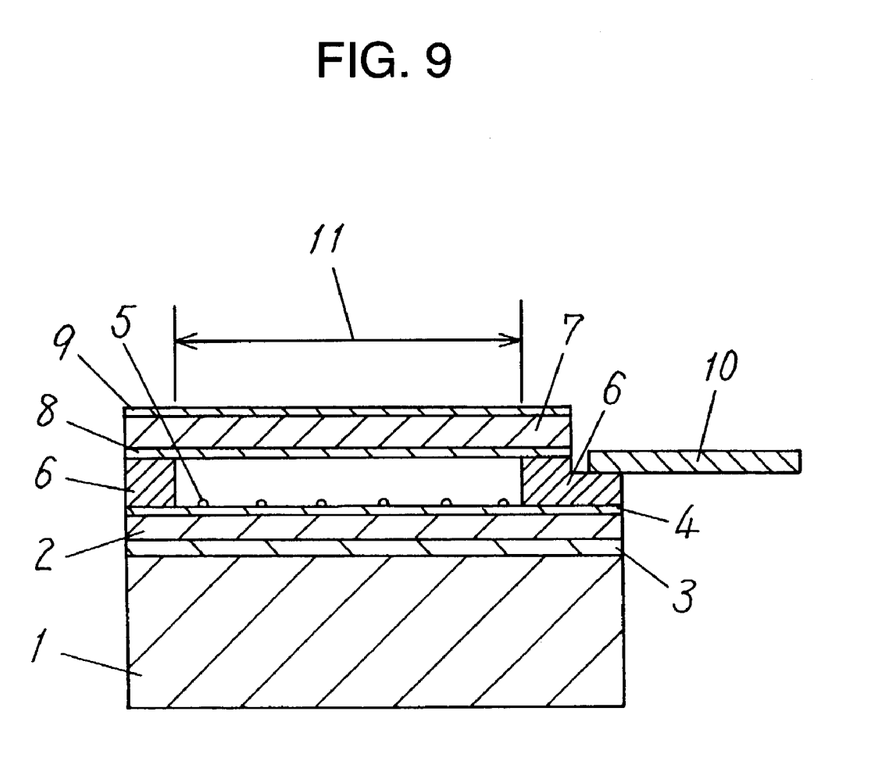
FIG. 9 is a cross-sectional view of a conventional touch panel.

A conventional plastic touch panel is described below with reference to an accompanying figure using a transparent touch panel as an example. In the figure, the thickness of members is magnified to make the configuration more comprehensible.

FIG. 9 shows a cross-sectional view of a conventional touch panel. A transparent resin substrate 1 comprising a polycarbonate resin sheet or an acrylic resin sheet, and a first transparent film 2 comprising bi-axially oriented polyethylene terephthalate, are adhered to each other via a first transparent pressure sensitive adhesive layer 3.

On a top surface of the first transparent film 2, which is the surface opposite to the one that is adhered to the transparent resin substrate 1, a first transparent conductive layer 4 of indium tin oxide (hereinafter, referred to as ITO) is formed by sputtering. On the first transparent conductive layer 4, small-sized dot spacers 5 made of epoxy resin are disposed at a predetermined pitch.

A second transparent conductive layer 8 of ITO is formed beneath the bottom surface of a second transparent film 7. And the second transparent film 7 is facing to the first transparent film 2 in such a manner that the second transparent conductive layer 8 faces the first transparent conductive layer 4 with a predetermined space kept between the two layers. The first transparent film 1 and the second transparent film 7 are bonded to each other at an outer region 6 where insulating patterns, electrode patterns, wiring patterns and pressure sensitive adhesive material patterns are formed.

An inside of the outer region 6 constitutes a visible region 11 of the touch panel, where a user visibly identifies display patterns for operation of a display device and an apparatus, and operates these apparatuses.

The top surface of the second transparent film 7 is protected by a hard coat layer 9 for preventing from scratch.

A flexible circuit board 10 is adhered and fixed on the outer region 6, with another end of the circuit board 10 connected to an external circuit (not shown), to transmit signals led through from the first transparent conductive layer 4 and the second transparent conductive layer 8 to the external circuit.

An oriented polyethylene telephtalate (hereinafter, referred to as PET) film is preferably used for the films 2 and 7. Despite its low prices, PET can be easily provided with good properties including high heat-resistance and good adhesion to the transparent conductive layers especially when drawn to two directions (bi-axially oriented).

The following is a description of the operation of the conventional touch panel configured as described above.

First, when a given part of the top surface of the film 7 is depressed with a finger or a pen, the film 7 is partially bent downward with the part to be a center, and the corresponding part of the transparent conductive layer 4 comes in contact with the transparent conductive layer 8.

At this time, the rest of the layers which are not subject to the pressing operation remain in non-contact with each other due to the restriction of the dot spacers 5.

The position of the aforementioned part being pressed is detected by an external circuit through the flexible circuit board 10 by calculating a voltage ratio against predetermined voltages applied respectively on the transparent conductive layer 4 and the transparent conductive layer 8 at the contacting point.

However, the aforementioned conventional touch panel features a marked difference in thermal expansion coefficient between the transparent film 2 and the resin substrate 1. This is because the former uses an oriented film such as bi-axially oriented PET in which ITO film can be easily formed, while the latter is produced by methods such as extrusion or cast molding and does not undergo any particular orientation treatment. Therefore, heat treatment during a production and temperature and humidity change after the production of the touch panel may cause thermal expansion of the transparent film 2 and the transparent resin substrate 1 to generate differences in dimensions between the two films, resulting in a warp in the touch panel.

A warped touch panel is difficult to mount on an electronic apparatus. For instance, a touch panel of a size suitable for 4-inch liquid crystal display apparatus (approximately 90 mm×70 mm), may warp 0.5 mm or more after being kept in a high-temperature and high-humidity environment (60° C., 95% RH) for 500 hours. Due to this, a user in charge of mounting needs to mount it on an electronic apparatus firmly, and this in turn, makes it difficult to reduce mounting processes. Moreover, since levels of warp increase in proportion to a size of the touch panel, it has been difficult to produce a high quality touch panel which can be applicable to a liquid crystal display device (LCD) larger than 6 inches.

DISCLOSURE OF THE INVENTION

A touch panel in accordance with an exemplary embodiment of the present invention comprises: a resin substrate; a first film in which a first conductive layer is formed on one surface and another surface is adhered to the resin substrate; a second film provided with a second conductive layer formed on a surface facing the first conductive layer of the first film; and a third film disposed on the surface the surface of the resin substrate opposite to the surface where the first film is bonded. Further, an adhesion of the first and third films are an adhered of the third film and the resin substrate is performed with an adhesive material or a pressure sensitive adhesive material.

BEST MODE FOR CARRYING OUT THE INVENTION

The preferred embodiments of the present invention are described below with reference to FIGS. 1 through 8. In each figure, thickness of members are enlarged to make the configuration more comprehensible.

First Preferred Embodiment

Figure 1:
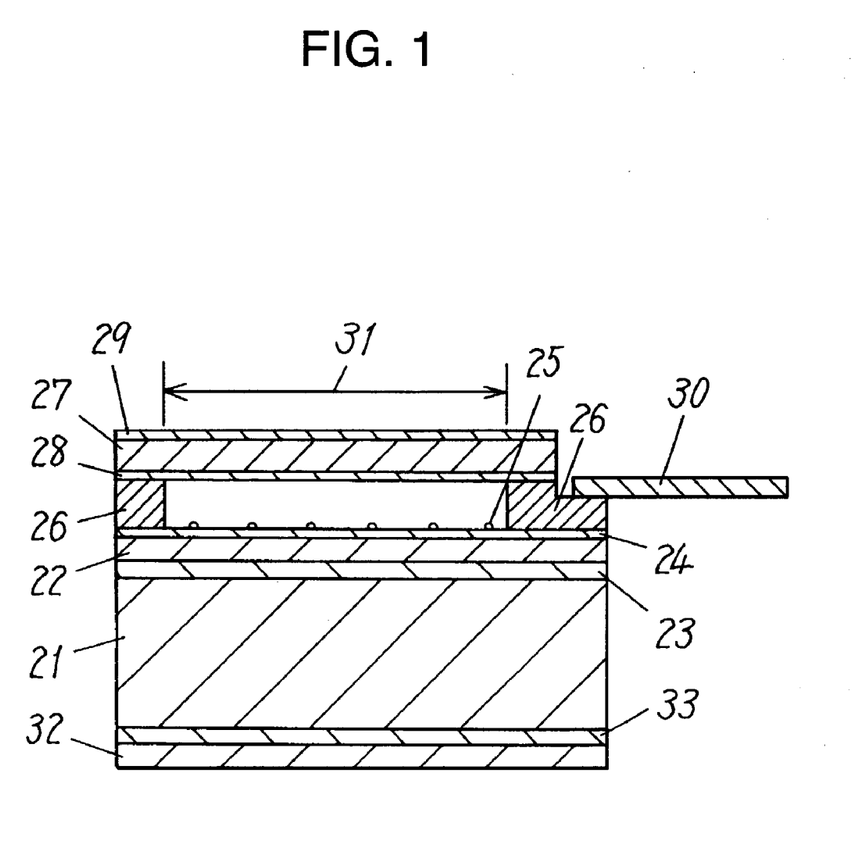
FIG. 1 is a cross-sectional view of a touch panel in accordance with a first preferred embodiment of the present invention.

FIG. 1 is a cross-sectional view of a touch panel in accordance with the first preferred embodiment of the present invention. In FIG. 1, a transparent resin substrate 21 comprises a polycarbonate sheet having a thickness of 1.0 mm and a thermal expansion coefficient of $6 \times 10^{-5}/°$ C., produced by extrusion molding. A first transparent film 22 comprises a bi-axially oriented PET having a thickness of 75 μm and thermal expansion coefficient of $1.5 \times 10^{-5}/°$ C. An entire top surface of the resin substrate 21 and the film 22 are adhered to each other by a first transparent adhesive layer 23 comprising acrylic pressure-sensitive adhesive of 25 μm in thickness.

A top surface of the film 22 is provided with a first transparent conductive layer 24 of ITO formed by sputtering. On the transparent conductive layer 24, small-sized dot spacers 25 of insulating epoxy resin are disposed at predetermined pitches.

Beneath an undersurface of a second transparent film 27 comprising bi-axially oriented PET of 175 μm in thickness is a second transparent conductive layer 28 of ITO formed by sputtering. The conductive layer 28 faces the conductive layer 24 with insulation keeping a space of approximately 100 μm in between them. The film 27 is adhered to the film 22, with a frame-like outer region 26 formed in the outer portion.

The outer region 26 is provided with epoxy resin insulating patterns, electrode patterns comprising Ag powder and polyester resin, wiring patterns and adhesion patterns comprising acrylic pressure-sensitive adhesive. The inner region surrounded by the outer region constitutes a visible region 31 of the touch panel.

On the top surface of the film 27 is a hard coat layer 29 that is 3 H in pencil hardness and made of acrylic resin to protect the film from scratches which is apt to occur during operation with a pen or a finger.

A flexible circuit board 10 is adhered and fixed on the outer region 26 with another end of the circuit board 10 connected to an external circuit (not shown) to deliver signals from the first transparent conductive layer 4 and the second transparent conductive layer 8 to an external circuit.

A third transparent film 32 of 75 μm in thickness and comprising bi-axially oriented PET is attached to the entire bottom surface of the resin substrate 21 to prevent warping with a first transparent adhesive layer 33 of 25 μm in thickness and comprising acrylic pressure-sensitive adhesive. The film 32 is produced with the same materials used to the film 22 and having a thermal expansion coefficient of $1.5 \times 10^{-5}/°$ C.

The transparent touch panel in accordance with the present preferred embodiment is configured as described above, and its operation is the same as that of the conventional touch panel described previously in the background art. In other words, by pressing a predetermined part of the top surface of the film 27 with a finger or a pen, the film 27 is partially deformed at and about the pressed point, and the conductive layers 24 and 28 come in contact with each other. The voltage ratio at the point of contact is led out through the flexible control panel 30 and detected by the external circuit.

At this time, other portions not subject to the pressing operation remain in a non-contact state due to the control of the dot spacers 25, as is the case with the prior art.

A production method of the touch panel in accordance with the present preferred embodiment is described in the following.

First, the transparent conductive layer 24 is formed by sputtering on the surface of the film 22. On the other hand, on one surface of the film 27 the hard coat layer 29 is formed using a roll coater, and on another surface the transparent conductive layer 28 is formed by sputtering.

Then, the dot spacers 25 and insulation patterns, electrode patterns, wiring patterns, pressure sensitive adhesive patterns, which make up the outer region 26, are formed by methods such as a screening printing on one of or both of the film 22 and the film 27.

The film 22, after undergoing the process described above, is adhered to the first transparent pressure sensitive adhesive layer 23 formed on the resin substrate 21 by coating or by the use of tapes in such a manner that the surface on which the conductive layer 24 is formed faces upward.

Subsequently, the films 27 and 22 are adhered to each other at the outer region 26, so that the conductive layer 28 faces the conductive layer 24 with a predetermined distance kept in between them.

Subsequently, the second transparent pressure sensitive adhesive layer 33 is formed by coating or by the use of tapes on the third transparent anti-warping film 32 followed by an adhesion of the third transparent film 32 to the bottom surface of the resin substrate 21 by using the adhesive layer 33.

As the next step, the aforementioned laminate is placed in an oven of approximately 50 to 80° C. to slightly soften the outer region 26 in order to ensure evenness of the surface of the film 27 by eliminating stress of the film 27 which is adhered only around the outer region 26.

Finally, the flexible circuit board 30 is connected onto the predetermined portion under heat and pressure to complete the touch panel.

The touch panel constructed as described above realizes the size suitable for a 4-inch LCD (approximately 90 mm×70 mm) while keeping the level of warp at 0.1 mm or less.

The touch panel of this embodiment does not warp more than 0.1 mm after being kept in an environment of high temperature and high humidity (60° C., 95% RH) for 500 hours while maintaining the total light transmittance of 80%.

Since the entire surfaces between of the films 22 and 32 and between the resin substrate 21 and the films 32 are bonded via the adhesive layers 23 and 33 and there is no airspace in between, reflection of light at the interfaces is reduced, and consequently the total light transmittance is increased.

Even if the films mentioned above are attached entirely to only the visible section of the touch panel, it still achieves the level of the total light transmittance of the same.

According to the present embodiment, when touch panels larger than the size described previously are produced, for example, for 6-inch LCD (approximately 110 mm×90 mm) and for 10.4-inch LCD (approximately 220 mm×180 mm), they do not warp more than 0.1 mm. Moreover, when touch panels are kept under a high-temperature and high-humidity environment (60° C., 95% RH) for 500 hours, the warp does not change significantly and stays at not more that 0.1 mm.

This is because the film 22 and the film 32, both of which are made of the same material and having the same thermal expansion coefficient, are bonded by the pressure sensitive adhesive respectively on the top and bottom surfaces of the resin substrate 21 made of polycarbonate sheet and sandwich the same. According to this construction, forces applied on the top and bottom surfaces of the resin substrate 21 become equal to each other even if temperature or humidity changes during or after the production process of the touch panel. In other words, the film 32 acts as an anti-warping material for the resin substrate 21 and decreases warp of the touch panel.

As described above, according to the present embodiment, a larger touch panel with minimized warping can be easily produced.

For the resin substrate 21, resin sheets produced by general extrusion, casting, or injection molding and made of resins such as acrylic resin, methacrylic resin, polyolefin resin, polycyclohexadiene resin, and norbornene resin can be used, instead of polycarbonate resin used in the present embodiment. Practical thickness of the resin sheet is, for instance, 0.2 to 10 mm and preferably 0.3 to 3 mm.

For the films 22 and 32, oriented sheets such as a bi-axially oriented polyethylene naphtarate and mono-axially oriented PET can be used instead of a bi-axially oriented PET. Practical thickness of the films is, for instance, 0.01 to 0.4 mm and preferably 0.025 to 0.2 mm.

Since the resin substrate 21 and the films 22 and 23 are made of relatively inexpensive materials, addition of the film 32 does not raise the overall cost of the touch panel.

It is preferable to produce the film 32 with a film identical to the film 22 in terms of component materials and thermal expansion coefficient, however, if a difference in thermal expansion coefficient between the film 32 and film 22 is $1 \times 10^{-5}$/° C. or less, a warp of the touch panel remains at around 0.1 mm or less after being kept under the high-temperature and high-humidity environment (60° C., 95% RH) for 500 hours.

For the pressure sensitive adhesive layers 23 and 33, pressure sensitive adhesives or pressure-sensitive adhesive double coated tapes made of materials such as acrylic resin, silicone resin and lubber can be used. Practical thickness of the adhesive layers is, for instance, 0.01 to 0.5 mm, and preferably 0.02 to 0.2 mm. When the adhesive layers 23 and 33 are the same in terms of component materials and thickness, forces applied on the top and bottom surfaces of the resin substrate 21 by the adhesive layers stay equal to each other even if temperature or humidity changes during or after the production process of the touch panel, and consequently, warp of the touch panel can be reduced.

The pressure sensitive adhesive layers 23 and 33 can be formed by a coating with a roll coater on the resin substrate 21 or the films 22 and film 32.

As another configuration, as the adhesive layers 23 and 33, a pressure-sensitive adhesive double coated tape can be used. Both of pressure-sensitive adhesive double coated tapes with a substrate or without a substrate can be used. However, especially when the adhesive double coated tape with a substrate is used, component materials including the substrate and thickness of the adhesive layers 23 and 33 should preferably the same in order to maintain forces applied respectively on the top and bottom surfaces of the resin substrate 21 equal to each other when temperature or humidity changes.

For the film 27, other oriented films such as bi-axially oriented polyethylene naphtherate and mono-axially oriented polyethylene telephtherate as well as polycarbonate film, polyether sulphone film, polyarylate film, and polyolephin film can be used instead of bi-axially oriented PET. Practical thickness of the film 27 is, for instance, 0.05 to 0.4 mm, and preferably 0.1 to 0.2 mm.

The film 27 does not directly contribute to warping of the touch panel significantly. However, if a material whose thermal expansion coefficient greatly differs from that of the film 22 is used for the film 27, the film 27 may become waved, deteriorating the visibility of the touch panel. This is because temperature or humidity change deforms the film 27 as it is only fixed around the outer region 26 while the film 22 is adhered to the rigid resin substrate 21. Therefore, it is preferable to use the same materials for the film 27 as those of the films 22 and 32.

To prevent warp, differences between the smallest and the largest thermal expansion coefficient of the film 22, film 27 and film 32 should preferably be maintained at $1 \times 10^{-5}$/° C. or less. Under this condition, the touch panel does not warp more than 0.1 mm and waving of the film 27 stays insignificant even after being kept under the high-temperature and high-humidity environment (60° C., 95% RH) for 500 hours.

For the first and second transparent conductive layers 24 and 28, thin film made of materials such as tin oxide ($SnO_2$), zinc oxide (ZnO), gold (Au) thin film, silver (Ag) thin film can be used instead of ITO.

Although a transparent touch panel is described as an example, the application of the present invention is not limited to the transparent touch panel. As the operational principles of a touch panel suggests, similar results can be obtained even when non-transparent materials are used. For example, a carbon/resin composite conductive layer can be used as a conductive layer.

Another production method of the touch panel of this embodiment comprises the steps of:

adhering the patterned first and the second transparent films at the outer regions;

adhering the bonded films onto the transparent resin substrate via the first transparent pressure sensitive adhesive layer; and adhering the third transparent film via the second transparent pressure sensitive adhesive layer.

Still another method of the production method comprises the steps of:

adhering the third transparent film to the transparent resin substrate via the second transparent pressure sensitive adhesive layer; and adhering a laminate of the first and second transparent films adhered to each other at the outer region to the transparent resin substrate via the first transparent pressure sensitive adhesive layer.

Although a touch panel of predetermined size was described in the above description, the size is not limited to these. The larger the touch panel becomes, the more the effects of the present invention (i.e. reducing warp) is improved.

Second Preferred Embodiment

Figure 2:
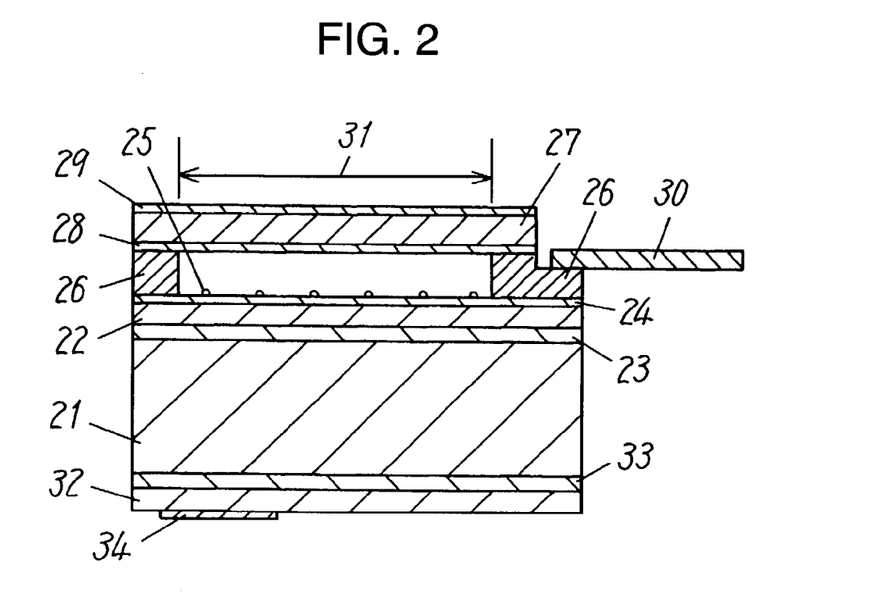
FIG. 2 is a cross-sectional view of a touch panel in accordance with a second preferred embodiment of the present invention.

FIG. 2 is a cross-sectional view of a touch panel in accordance with the second preferred embodiment of the present invention. It is noted that the components which are the same as those in the first preferred embodiment are marked with the same numerals, and explanation of those components is omitted.

In the present preferred embodiment, the touch panel differs from that of the first preferred embodiment such that a display pattern 34 for operation of the apparatus is screen printed with polyester color ink on the bottom surface of the third transparent anti-warping film 32 as shown in FIG. 2. As the other components are the same as those of the first embodiment, the explanation of those components is omitted.

The warp of the touch panel of the size for 4-inch LCD constructed as described above can be maintained at 0.1 mm or less, as is the case with the first preferred embodiment. Additionally, the touch panel of this embodiment does not warp more than 0.1 mm after being kept in an environment of high temperature and high humidity (60° C., 95% RH) for 500 hours. The change of warp is negligible.

As described above, the touch panel of the present embodiment shows little warp as is the case with the first preferred embodiment. Since the film 32 having display patterns 34 formed on the surface thereof adheres to the entire surface of the resin substrate 21 via the adhesive layer 33 which is formed at least on the visible region 31 of the touch panel, no airspace is formed between the transparent resin substrate 21 and the display patterns 34.

Conventionally, a display pattern for operation of the apparatus is formed on a separate sheet from the touch panel, and the sheet is attached to the bottom of the touch panel at the outer region like a frame. On the other hand, a touch panel of the present preferred embodiment provides clear visibility of the display patterns 34 due to the elimination of airspace, and facilitates to provide an electronic apparatus superior in visibility of display patterns.

The location of the display pattern 34 is not limited to the bottom surface of the film 32 used to prevent warping. In other words, the display pattern 34 may be formed on the surface of the film 32 attached to the pressure sensitive adhesive layer 33 with the same effects.

Third Preferred Embodiment

Figure 3:
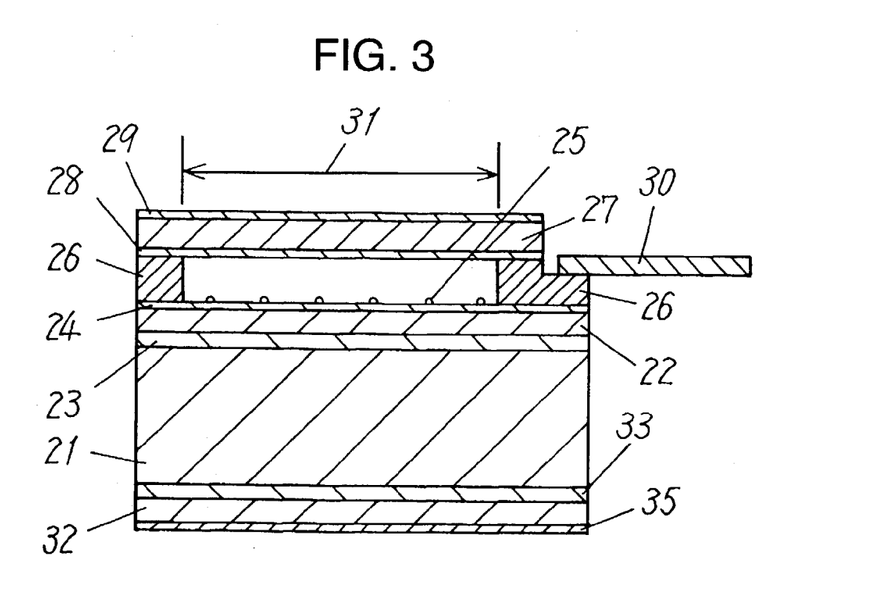
FIG. 3 is a cross-sectional view of a touch panel in accordance with a third preferred embodiment of the present invention.

FIG. 3 is a cross-sectional view of the third preferred embodiment of the present invention. It is noted that the components which are the same as those in the first preferred embodiment are marked with the same numerals, and explanation of those components is omitted.

In the present preferred embodiment, the touch panel differs from that of the first preferred embodiment such that the fluorocarbon resin anti-reflection layer 35 whose refractive index is 1.38 is disposed on the bottom surface of the third transparent film 32 as shown in FIG. 3. As the other components are the same as those of the first embodiment, the explanation of those components is omitted.

The warp of the touch panel of the size suitable for 4-inch to 10.4-inch LCD constructed as described above is maintained at 0.1 mm or less, as is the case with the first preferred embodiment. Additionally, the touch panel of this embodiment does not warp more than 0.1 mm after being kept in an environment of high temperature and high humidity (60° C., 95% RH) for 500 hours. The change of warp is negligible.

Moreover, according to the present embodiment, the anti-reflection film 35 increases the total light transmittance of the touch panel up to 82%.

The improvement of the total light transmittance is attributed to a decrease in the light reflection of the most bottom surface of the touch panel, i.e. the bottom surface of the anti-warping film 32, from 4% to approximately 2%.

As the anti-reflection layer 35, a single layer with a lower refractive index such as silica ($SiO_2$) layer and magnesium fluoride ($MgF_2$) layer can be used instead of fluorocarbon resin described above. A multi-layer structure of lamination of a layer with a higher refractive index such as titania ($TiO_2$) and a layer with a lower refractive index such as silica ($SiO_2$) can also be used. When a multi-layer structure is used, in particular, a reflection rate of the bottom surface of the film 32 can be reduced to around 0.2%, thereby providing the total light transmittance of the touch panel of 84%.

Fourth Preferred Embodiment

Figure 4:
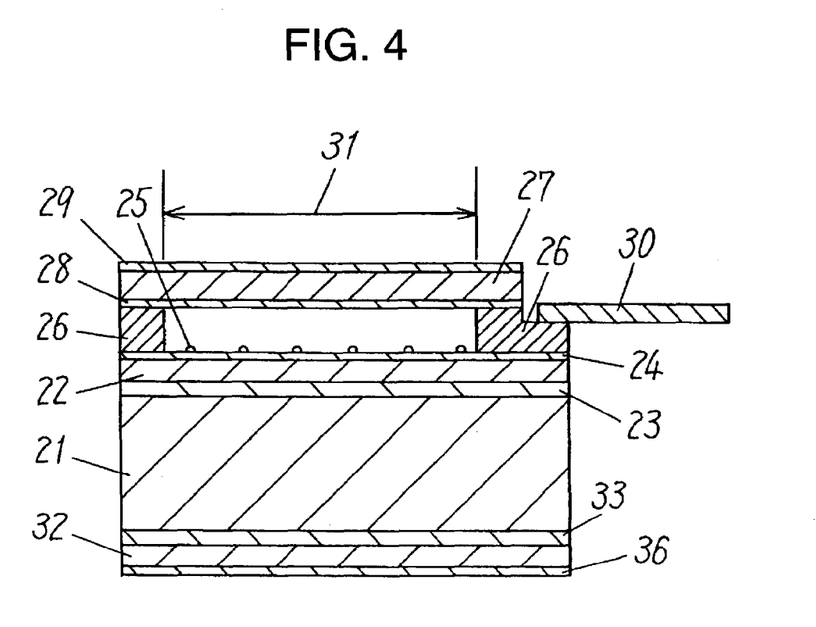
FIG. 4 is a cross-sectional view of a touch panel in accordance with a fourth preferred embodiment of the present invention.

FIG. 4 is a cross-sectional view of a touch panel in accordance with the fourth preferred embodiment of the present invention. It is noted that the components which are the same as those in the first preferred embodiment are marked with the same numerals, and explanation of those components are omitted.

In the present preferred embodiment, the touch panel differs from that of the first preferred embodiment such that an acrylic resin hard coat layer 36 with a pencil hardness of 3H is formed on the bottom surface of the third transparent film 32 for preventing warping as shown in FIG. 4. As the other components are the same as those of the first embodiment, their explanation is omitted.

The warp of the touch panel of the size for 4-inch to 10.4-inch LCD constructed as described above is maintained at 0.1 mm or less, as is the case with the first preferred embodiment. Additionally, the touch panel of the present embodiment does not warp more than 0.1 mm after being kept in an environment of high temperature and high humidity (60° C., 95% RH) for 500 hours. The change of warp is negligible. The total light transmittance is 80%.

In addition, according to the touch panel of the present embodiment, since the hard coat layer 36 is formed on the bottom surface of the film 32, the hardness of the bottom surface of the film 32 is enhanced thus improving abrasion-resistance of the bottom surface of the touch panel. This structure easily increases yields of the process of mounting the touch panel onto electronic apparatuses.

The configuration of the third preferred embodiment can also be added to a touch panel of the fourth preferred embodiment.

Figure 5:
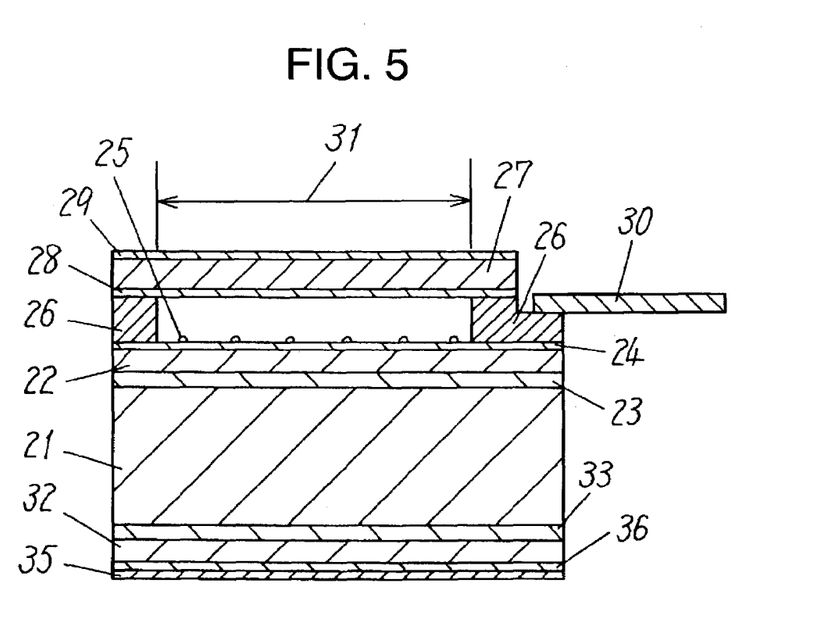
FIG. 5 is a cross-sectional view of another modification of the touch panel in accordance with the fourth preferred embodiment of the present invention.

In other words, as shown in a cross-sectional view of the touch panel in FIG. 5, on the bottom surface of the hard coat layer 36 which is formed on the bottom surface of the film 32, the multi-layer anti-reflection layer 35, for example, a laminate of titania and silica, can be formed.

In the construction described above, the warp of the touch panel of the size for 4-inch to 10.4-inch LCD maintains at 0.1 mm or less, and even when the touch panel is kept in an environment of high temperature and high humidity (60° C., 95% RH) for 500 hours, its warp is at 0.1 mm or less. The change of warp is negligible while the total light transmittance is 84%.

The total light transmittance of the touch panel can be attributable to the reduction of the total light reflection of the bottom surface of the touch panel from 4% to approximately 0.2%, as is the case with the third preferred embodiment.

In the construction described above, when the anti-reflection layer 35 is formed in the final process of touch panel production, the hard coat layer 36 protects the bottom surface of the third transparent film 32 in the preceding processes. As such, high quality touch panels can be easily produced.

Fifth Preferred Embodiment

Figure 6:
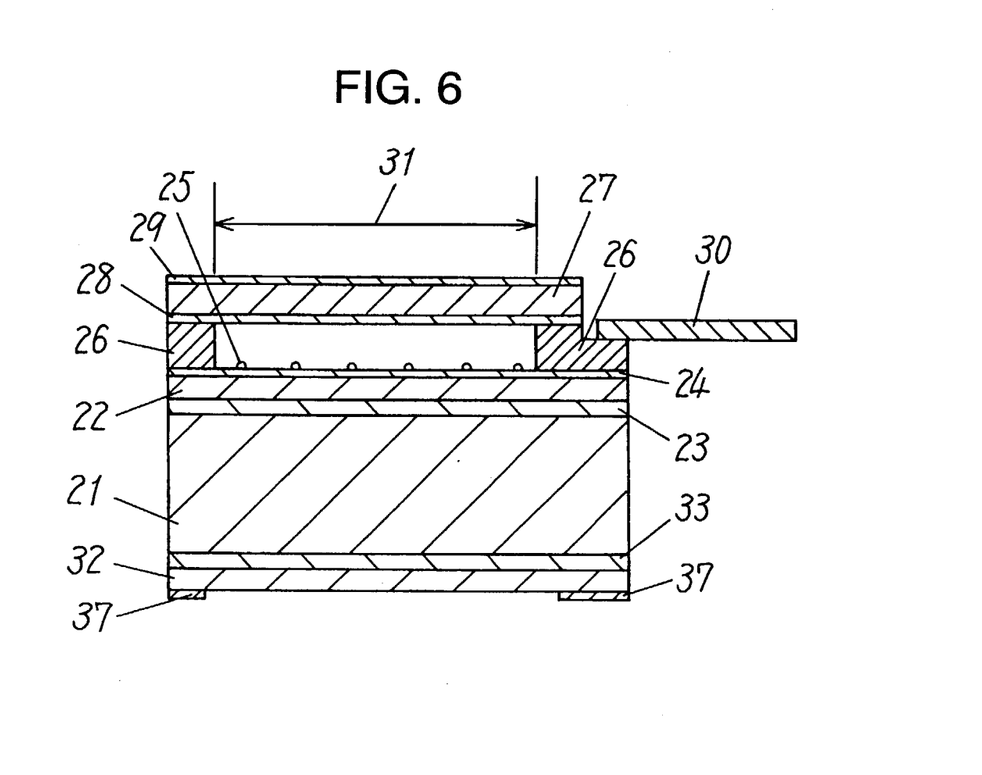
FIG. 6 is a cross-sectional view of a touch panel in accordance with a fifth preferred embodiment of the present invention.

FIG. 6 is a cross-sectional view of a touch panel in accordance with the fifth preferred embodiment of the present invention. It is noted that the components which are the same as those in the first preferred embodiment are marked with the same numerals, and explanation of those components omitted.

In the present preferred embodiment, the touch panel differs from that of the first preferred embodiment such that the third adhesive layer 37 comprising acrylic resin is formed only at the outer region of the bottom surface of the third transparent film 32 like a frame to prevent warping as shown in FIG. 6. As the other components are the same as those of the first embodiment, their explanation is omitted.

The warp of the touch panel of the size for 4-inch to 10.4-inch LCD constructed as described above is maintained at 0.1 mm or less, as is the case with the first preferred embodiment. Additionally, the touch panel of the present embodiment does not warp more than 0.1 mm after being kept in an environment of high temperature and high humidity (60° C., 95% RH) for 500 hours. The change of warp is negligible. The total light transmittance is 80%.

As described above, a touch panel of the fifth embodiment suffers little warping caused by changes in temperature during and after the production processes. Moreover, since the third adhesive layer 37 is formed on the bottom surface of the touch panel, the touch panel can be easily installed firmly by adhering and fixing the third adhesive layer 37 onto display elements such as LCD. This further improves operability during installation process of the touch panel onto the electronic apparatus.

Figure 7:
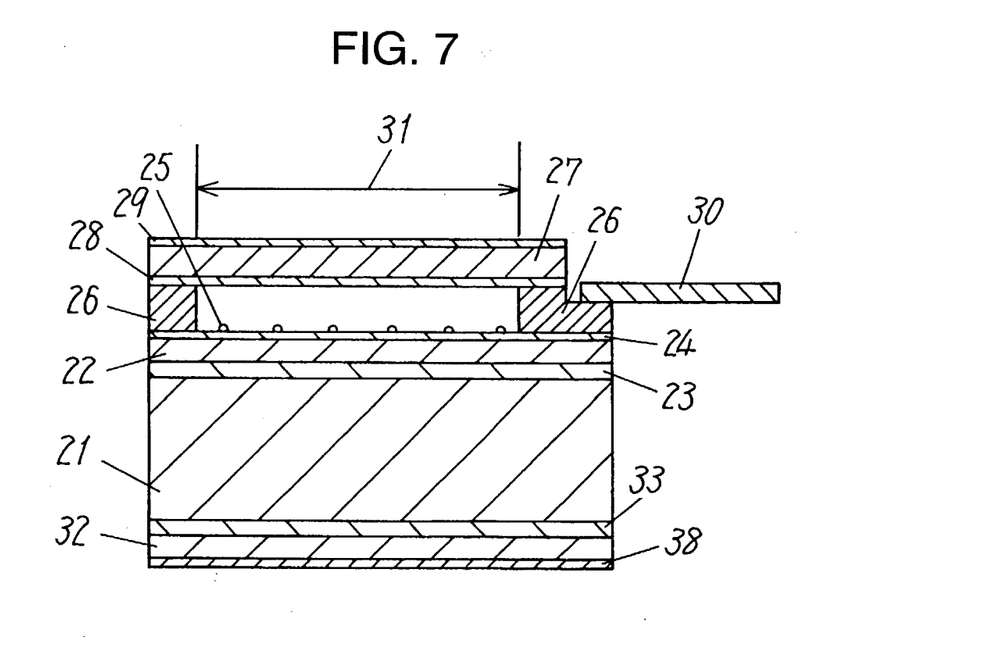
FIG. 7 is a cross-sectional view of another modification of the touch panel in accordance with the fifth preferred embodiment of the present invention.

As shown in the cross-sectional view of FIG. 7, a third adhesive layer 38 comprising acrylic resin can be formed over the entire surface of the film 32 so that the entire surface including the visible region 31 can be bonded to the electronic apparatus. This construction also improves operability during the installation process of the touch panel onto the electronic apparatus as described above.

Further, the entire bottom surface of the film 32 corresponding to the visible region 31, adheres to a display apparatus via the third adhesive layer 38, thereby eliminating airspace between the touch panel and the display elements of the display apparatus. This reduces reflection of light on the bottom surface of the touch panel and the surface of the display elements, leading to even superior visibility, with clearer and better view than the touch panel of the previously mentioned construction.

In any of the aforementioned constructions, pressure-sensitive adhesives or pressure-sensitive adhesive double coated tapes made of materials such as silicone resin or a rubber as the third adhesive layer 37 or 38 as well as acrylic pressure-sensitive adhesive. The thickness of the adhesive layers 37 and 38 should be practically 0.01 to 0.2 mm, and preferably 0.02 to 0.2 mm.

In the foregoing description, the adhesive layer 37 or 38 is formed like a frame or over the entire undersurface of the film 32, however, they can be formed differently in predetermined patterns by screening printing or with a dispenser. The adhesive layer 37 or 38 can also be painted with a roll coater.

As the adhesive layer 37 or 38, both of pressure-sensitive adhesive double coated tapes with a substrate or without a substrate can be used.

Sixth Preferred Embodiment

Figure 8:
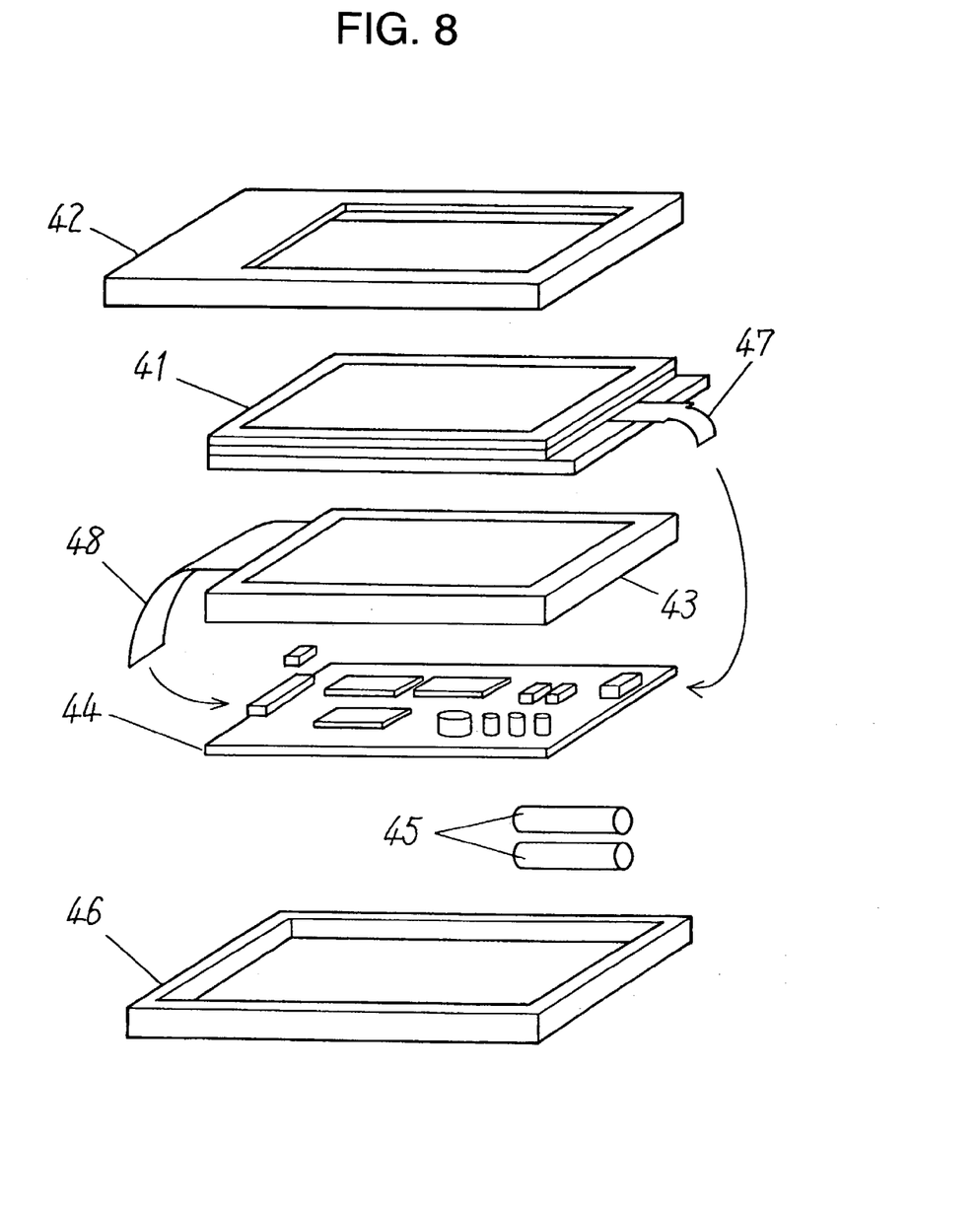
FIG. 8 is a exploded perspective view of a touch panel in accordance with a sixth preferred embodiment of the present invention.

FIG. 8 is a exploded perspective view of a handheld computer as an example of the electronic apparatus in accordance with the sixth preferred embodiment of the prevent invention. In FIG. 8, a touch panel 41 in accordance with the first preferred embodiment is disposed beneath the upper case 42. The liquid crystal display (LCD) 43 is disposed beneath the touch panel 41. A control circuit 44 comprising electronic components such as central processing unit and memory, is arranged under the LCD 43. A battery 45 supplies power to the control circuit 44. These components are positioned, maintaining predetermined physical relations to one another, by the upper case 42 and the lower case 46. The touch panel 41 and the LCD 43 are connected to the control circuit 44, via flexible printed circuits 47 and 48, led out from the sides of the panel and the LCD.

By pressing the upper surface of the touch panel 41 with a pen or finger, the control circuit 44 comprising the central processing unit and the memory, which are involved in the operation of the handheld computer, turns on and off the power, selects a software, and activates functions of the selected software. The LCD 34 is configured such that its display corresponds to the functions being conducted.

The handheld computer of the present preferred embodiment is configured as described above, and activates predetermined functions by judging certain signals, which are delivered when an operational action is taken on the touch panel 41, by the control circuit 44.

After the handheld computer configured as described above is kept under a high-temperature and high-humidity (60° C. 95% RH) environment for 500 hours, the touch panel 41 of the handheld computer is examined and found that it suffers almost no warping, and maintains good operability and reliability of the electronic apparatus.

Since warp of the touch panel 41 is small, it can be installed into the handheld computer smoothly, improving operational efficiency and reducing cost.

Even when a LCD larger than 6 inch is used for the touch panel 41, similar results as described above can be obtained. Thus an electronic apparatus with a larger display screen featuring good visibility and operability can be easily obtained.

The foregoing description refers to a transparent touch panel mounted on the surface of the LCD 43. When the touch panel 41 is not transparent, it can be mounted on any given part other than the LCD 43 of the electronic apparatus, for example, the front surface of a keyboard. In this case as well, since the touch panel 41 warps only little, it can be mounted smoothly.

INDUSTRIAL APPLICABILITY

As thus far described, the touch panel of the present invention comprises an anti-warping film adhered to the bottom surface of the resin film. Therefore, the anti-warping effect of the film decreases warping of the touch panel caused by changes in temperature and humidity during and after the production of the touch panel, at low cost. Therefore, the transparent touch panel shows small warp and high quality, and can be installed in an LCD of 6 inches or larger. A touch panel configured in accordance with the present invention is beneficial by being especially effective with transparent touch panels.

| Reference Numerals | |
| --- | --- |
| 21 | transparent resin substrate |
| 22 | first transparent film |
| 23 | first transparent adhesive layer |
| 24 | first transparent conductive layer |
| 25 | dot spacers |
| 26 | outer region 26 |
| 27 | second transparent film |
| 28 | second transparent conductive layer |
| 29, 36 | hard coat layer |
| 30, 47, 48 | flexible circuit board |
| 31 | visible region |
| 32 | third transparent film |
| 33 | transparent adhesive layer |
| 34 | a display pattern |
| 35 | anti-reflection layer |
| 37, 38 | third adhesive layer |
| 41 | touch panel |
| 42 | upper case 42 |
| 43 | liquid crystal display 43 |
| 44 | control circuit 44 |
| 45 | battery 45 |
| 46 | lower case 46 |

The invention claimed is:

1. A touch panel comprising:
a resin substrate;
a first film provided with a first conductive layer formed on one surface thereof, another surface of said first film adhering to a first surface of said resin substrate;
a second film provided with a second conductive layer formed on one surface of said second film facing the first conductive layer; and
a third film adhering a surface of said resin substrate opposite to the first surface of said resin substrate;
said first film and said third film being made of the same material and having substantially the same thickness.

2. The touch panel of claim 1, wherein an adhesion of said resin substrate and said first film and said resin substrate and said third film are performed via pressure sensitive adhesive layers.

3. The touch panel of claim 2, wherein said pressure sensitive adhesive layer adhering said resin substrate and said first film and said pressure sensitive adhesive layer adhering said resin substrate and said third film have substantially same thickness and are made of same materials.

4. The touch panel of claim 1, wherein a difference in thermal expansion coefficient between said first film and said third film is not more than $1 \times 10^{-5}/°C$.

5. The touch panel of claim 1, wherein said resin substrate is a resin sheet produced by one of extrusion, casting and injection molding, and said first film and said third film comprising oriented film.

6. The touch panel of claim 1, wherein a difference in thermal expansion coefficient between smallest and largest thermal expansion coefficients among said first, second and third films is not more than $1 \times 10^{-5}/°C$.

7. The touch panel of claim 1, further comprising a hard coat layer formed on said third film.

8. The touch panel of claim 1, further comprising an pressure sensitive adhesive layer formed on a surface of said third film opposite to the surface adhering said resin substrate.

9. The touch panel of claim 1, wherein said resin substrate, said first conductive layer, said first film, said second conductive layer, said second film and said third film comprise transparent materials.

10. The touch panel of claim 9, further comprising display patterns formed on said third film.

11. The touch panel of claim 9, further comprising an anti-reflection layer formed on said third film.

12. An electronic apparatus provided with the touch panel of claim 9, wherein said apparatus activates predetermined functions according to a judgement of a control circuit, said judgement based on a predetermined signal obtained by an operation to said touch panel.

13. The touch panel of claim 1, wherein entire portions of said first film and said third film corresponding to a visible region adhere to said resin substrate.

14. An electronic apparatus provided with the touch panel of claim 1, wherein said apparatus activates predetermined functions according to a judgement of a control circuit, said judgement based on a predetermined signal obtained by an operation to said touch panel.

* * * * *

UNITED STATES PATENT AND TRADEMARK OFFICE
CERTIFICATE OF CORRECTION

PATENT NO. : 7,161,588 B2 Page 1 of 1
APPLICATION NO. : 10/332419
DATED : January 9, 2007
INVENTOR(S) : Akira Nakanishi et al.

It is certified that error appears in the above-identified patent and that said Letters Patent is hereby corrected as shown below:

Title Page, Item (22) PCT Filed
Change "Jul. 26, 2002" to -- April 26, 2002 --

Signed and Sealed this

Twelfth Day of June, 2007

JON W. DUDAS
*Director of the United States Patent and Trademark Office*